(12) United States Patent
Hendriks et al.

(10) Patent No.: US 7,021,584 B2
(45) Date of Patent: Apr. 4, 2006

(54) AUTOMATIC CONTROL OF SOD ROLL FLAPS

(75) Inventors: Emanuel A. Hendriks, Heythuysen (NL); Mathias M. Hendriks, Baemex (NL); Johannes G. Hendriks, Heythuysen (NL); Wilhelmus J. Hendriks, Heythuysen (NL); Thomas E. Noyes, II, Creston, OH (US)

(73) Assignee: Steiner Turf Equipment, Inc., Providence, RI (US)

( * ) Notice: Subject to any disclaimer, the term of this patent is extended or adjusted under 35 U.S.C. 154(b) by 0 days.

(21) Appl. No.: 10/618,844

(22) Filed: Jul. 14, 2003

(65) Prior Publication Data

US 2004/0188106 A1 Sep. 30, 2004

Related U.S. Application Data

(60) Provisional application No. 60/395,912, filed on Jul. 15, 2002.

(51) Int. Cl.
*B65H 18/08* (2006.01)

(52) U.S. Cl. ............... 242/534; 242/534.2; 242/541.3; 242/DIG. 3; 172/19; 172/33

(58) Field of Classification Search ............... 242/534, 242/534.2, 541.3, DIG. 3; 172/19, 33
See application file for complete search history.

(56) References Cited

U.S. PATENT DOCUMENTS

| | | |
|---|---|---|
| 2,617,347 A | 11/1952 | Provost |
| 3,429,377 A | 2/1969 | Nunes, Jr. |
| 3,509,944 A | 5/1970 | Brouwer et al. |
| 3,519,082 A | 7/1970 | Miner |
| 3,590,927 A | 7/1971 | Brouwer et al. |
| 3,653,448 A | 4/1972 | Morrill |
| 3,664,432 A | 5/1972 | Nunes, Jr. |
| 3,672,452 A | 6/1972 | Miner |
| 3,698,534 A | 10/1972 | Hadfield |
| 3,776,314 A | 12/1973 | Nunes, Jr. |
| 3,790,096 A | 2/1974 | Brouwer |
| 3,877,584 A | 4/1975 | Holcombe |
| 3,887,013 A | 6/1975 | Helberg |
| 3,935,904 A | 2/1976 | Beck |
| 4,063,384 A | 12/1977 | Warren et al. |
| 4,067,393 A | 1/1978 | Szarkowski |
| 4,142,691 A | 3/1979 | Watton |
| 4,162,726 A | 7/1979 | Hudson et al. |
| 4,294,316 A | 10/1981 | Hedley et al. |
| 4,345,659 A | 8/1982 | Arnold |
| 4,408,666 A | 10/1983 | Lawson |
| 4,828,040 A | 5/1989 | Schumacher |
| 4,832,130 A | 5/1989 | Brouwer et al. |

(Continued)

FOREIGN PATENT DOCUMENTS

CA 000789414 7/1968

(Continued)

*Primary Examiner*—John Q. Nguyen
(74) *Attorney, Agent, or Firm*—Harness, Dickey & Pierce, P.L.C.

(57) ABSTRACT

A sod roller for automatically controlling the angular position of the end or flap of a roll of sod about the roll. A device senses the end, or trailing edge, of a strip of sod as a roll is formed on a roll-up conveyor. The sod roller holds the roll in the roll-up conveyor as it continues to roll and ejects the roll from the roll-up conveyor in a manner responsive to the position of the trailing edge of the strip of sod.

10 Claims, 3 Drawing Sheets

U.S. PATENT DOCUMENTS

| | | |
|---|---|---|
| 4,966,239 A | 10/1990 | Hutchison |
| 5,165,843 A | 11/1992 | Hendriks et al. |
| 5,217,078 A | 6/1993 | Zinn |
| 5,230,602 A | 7/1993 | Schouten |
| 5,269,379 A | 12/1993 | Millar et al. |
| 5,626,195 A | 5/1997 | Dover |
| 5,655,729 A * | 8/1997 | Casimaty et al. ........ 242/535.1 |
| 5,697,760 A | 12/1997 | Rosen |
| 5,775,436 A | 7/1998 | Noyes, II et al. |
| 5,878,498 A | 3/1999 | Mundt |
| 5,906,091 A | 5/1999 | Gemar |
| 5,950,407 A | 9/1999 | Rosen |
| 6,056,064 A | 5/2000 | deVries |
| 6,223,830 B1 | 5/2001 | deVries |
| 6,237,427 B1 | 5/2001 | Helfrich et al. |
| 6,273,196 B1 | 8/2001 | Van Vuuren |
| 6,296,063 B1 | 10/2001 | Tvetene et al. |
| 6,305,162 B1 | 10/2001 | Cobo et al. |
| 6,343,986 B1 | 2/2002 | Hofer |
| 6,364,027 B1 | 4/2002 | Tvetene et al. |
| 6,527,502 B1 | 3/2003 | Leijenaar |
| 6,659,189 B1 | 12/2003 | Woerner et al. |
| 6,681,864 B1 | 1/2004 | Tvetene et al. |
| 6,783,318 B1 | 8/2004 | Tvetene et al. |
| 2002/0043375 A1 | 4/2002 | Tvetene et al. |
| 2004/0037683 A1 | 2/2004 | Tvetene et al. |

FOREIGN PATENT DOCUMENTS

| | | |
|---|---|---|
| CA | 000888588 | 12/1971 |
| EP | 1116429 A1 | 7/2001 |
| GB | 1228594 | 4/1971 |
| WO | WO 9535021 | 12/1995 |

* cited by examiner

AUTOMATIC CONTROL OF SOD ROLL FLAPS

CROSS-REFERENCE TO RELATED APPLICATIONS

This application claims the benefit of U.S. Provisional Application No. 60/395,912, filed on Jul. 15, 2002. The disclosure of the above application is incorporated herein by reference.

FIELD OF THE INVENTION

The present invention relates to the art of sod harvesting, namely the cutting and rolling of sod strips from the ground for distribution and relaying at a job site.

BACKGROUND OF THE INVENTION

Sod harvesting for commercial applications typically occurs by cutting strips of sod from the ground using a tractor-driven sod harvester. The cut strips are formed into rolls and stacked for pick up and transportation in bulk.

Mechanisms to automatically roll strips of sod have existed for many years. The sod rolls are generally discharged at the rear, upper end of an inclined transport conveyor. The rolls are preferably discharged in a location convenient for a worker to pick up the rolls of sod and stack them onto a pile, usually on a pallet carried by the sod harvester.

For example, U.S. Pat. No. 3,509,944 (Brouwer et al.) discloses a prior art sod harvester which includes such an inclined conveyor, and in which the rolls of sod are formed adjacent the upper end of the conveyor.

U.S. Pat. No. 4,832,130 (Brouwer et al.) discloses a self-propelled sod harvester. The harvester includes an inclined conveyor, and the conveyor delivers the strips of sod into a separate roll-forming enclosure. The roll-forming enclosure includes a pair of conveyors disposed generally at right angles to one another for forming the roll. The formed rolls are discharged onto a cart at the end of the harvester which can convey the formed roll to either side of the cart and clear of the harvester for its next pass.

The position of the flap, or outside end of the roll, becomes important for the worker, commonly called a "stacker", who lifts and transports the rolls of sod. FIG. 1 depicts a side view of a sod roll 1 after discharge from the roll-up mechanism onto a platform 2 or conveyor (not shown). If the flap 3 is located too far clockwise, it could fall down, partially unrolling the roll of sod. If it is located too far counterclockwise, a flap may hang down as it is picked up for stacking, which may be inconvenient to the stacker. Stackers typically prefer to have the flap located consistently to make their handling of the roll more predictable. The flap location becomes more important when the roll of sod will be handled mechanically, as with the robotic sod stacker, such as in a related application entitled "Robotic Sod Stacker" and filed on the filing date of the present application.

One common method of rolling a strip of sod utilizes a roll-up conveyor 5, which is located at the rear upper end of the transport conveyor 4. Ahead of the roll-up conveyor, the sod roll is started by catching and turning back the leading edge on a curved piece of expanded metal 6, typically referred to as a starter gate. The sod continues to roll under a tray 7 that provides sufficient friction to hold the top of the newly started roll generally stationary as the transport conveyor 4 moves the sod rearward (to the left in FIG. 1). As the roll moves rearward and grows, it encounters the roll-up conveyor 5, which is located above the transport conveyor 4. Roll-up conveyor 5 operates on a parallel plane but moves in a direction opposite and at a slightly slower speed than transport conveyor 4. This allows the sod roll 1 to finish being rolled in a smaller bundle than would be required if only a tray were used.

As the sod roll 1 is completed at the end of roll-up conveyor 5, it can be ejected from between the two conveyors 4, 5 by a plate 8 positioned close to the end of the roll-up conveyor. When sod roll 1 encounters plate 8, it is displaced away from the roll-up conveyor 5, and the transport conveyor 4 ejects the sod roll 1 rearward. The position of the flap can be controlled by the adjustable position of plate 8. As plate 8 moves further forward (to the right in FIG. 1), sod roll 1 will be ejected sooner, and as plate 8 moves rearward (to the left), sod roll 1 will be ejected later.

This apparatus and method of flap control has generally proven to be effective for most manual stacking conditions. However, even with the flap control plate 8 held stationary, the flap position may still change due to variations in sod thickness, length of the strip, and amount of slip between the sod and the two conveyors. Some designs have attempted to make the flap position easier to control than designs that require relocating the plate. For example, Nannings Van Loon has developed a mechanism which can move the flap adjuster plate back and forth using an electric actuator and a toggle switch. Brouwer turf Equipment also offers a variable speed hydraulically-driven roll-up conveyor, which can easily be adjusted to control the flap position. Both of these methods, however, require manual intervention to correct the flap position. Automated stacking requires automatic flap control.

All previous methods have been based on an assumed consistent location of the leading edge of the sod strip, consistent length, and consistent thickness. This greatly controls the location of the flap by varying the amount of time the sod roll sends in the roll-up conveyor or by the speed of the roll-up conveyor.

SUMMARY OF THE INVENTION

This invention is directed to a roll-up conveyor that ejects the sod roll based on the position of the end of flap of the sod roll.

The roll-up conveyor of the present invention includes a device for sensing the end, or trailing edge, of the strip of sod and a device for holding the roll in the roll-up conveyor as it continues to roll. The roll-up conveyor also includes a device for ejecting the roll from the roll-up conveyor in a manner responsive to the position of the trailing edge of the strip of sod.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the scope of the invention, its application, or uses.

Figure 1:
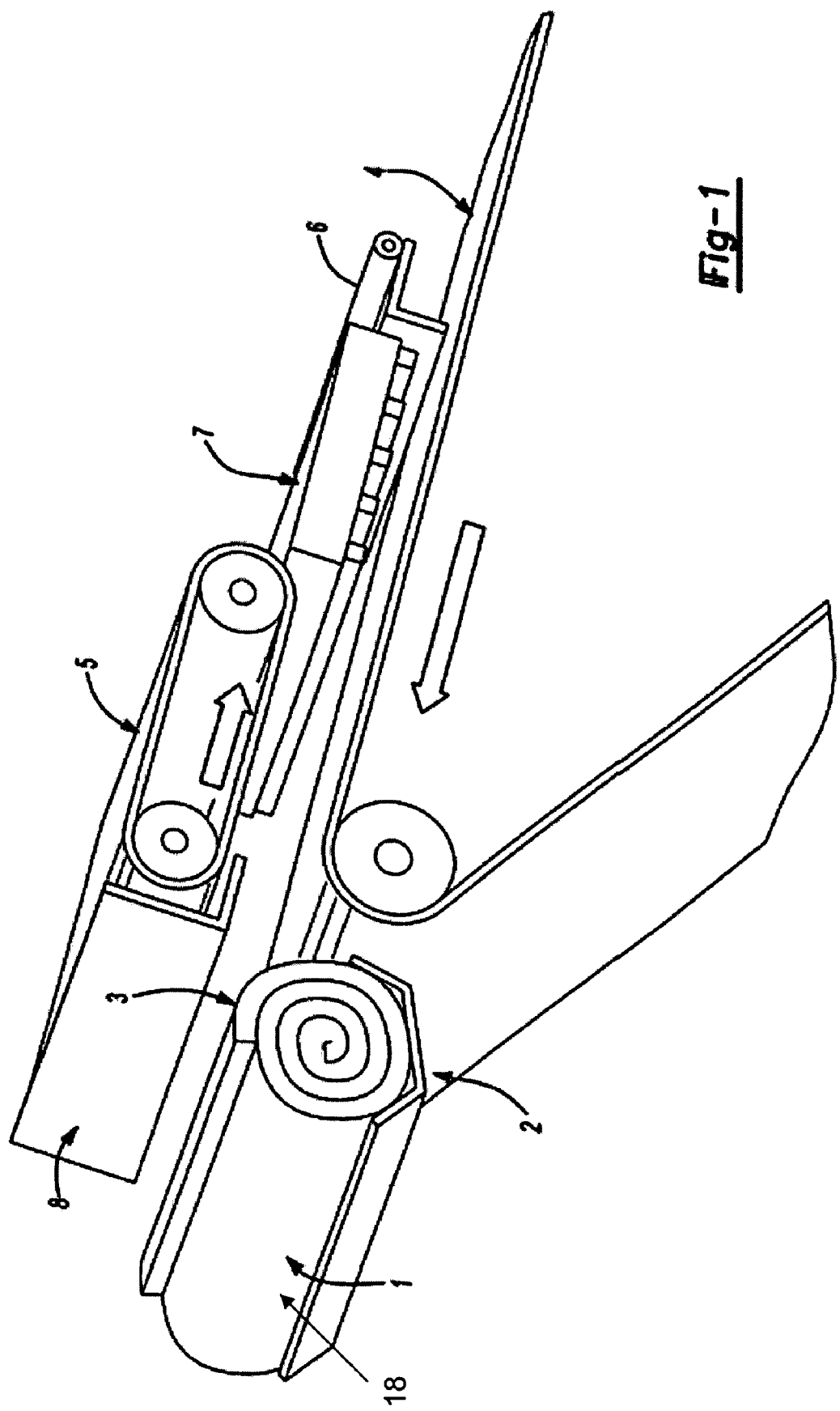
FIG. 1 depicts a sod roller in accordance with the conventional design, as is known in the art.
Figure 2:
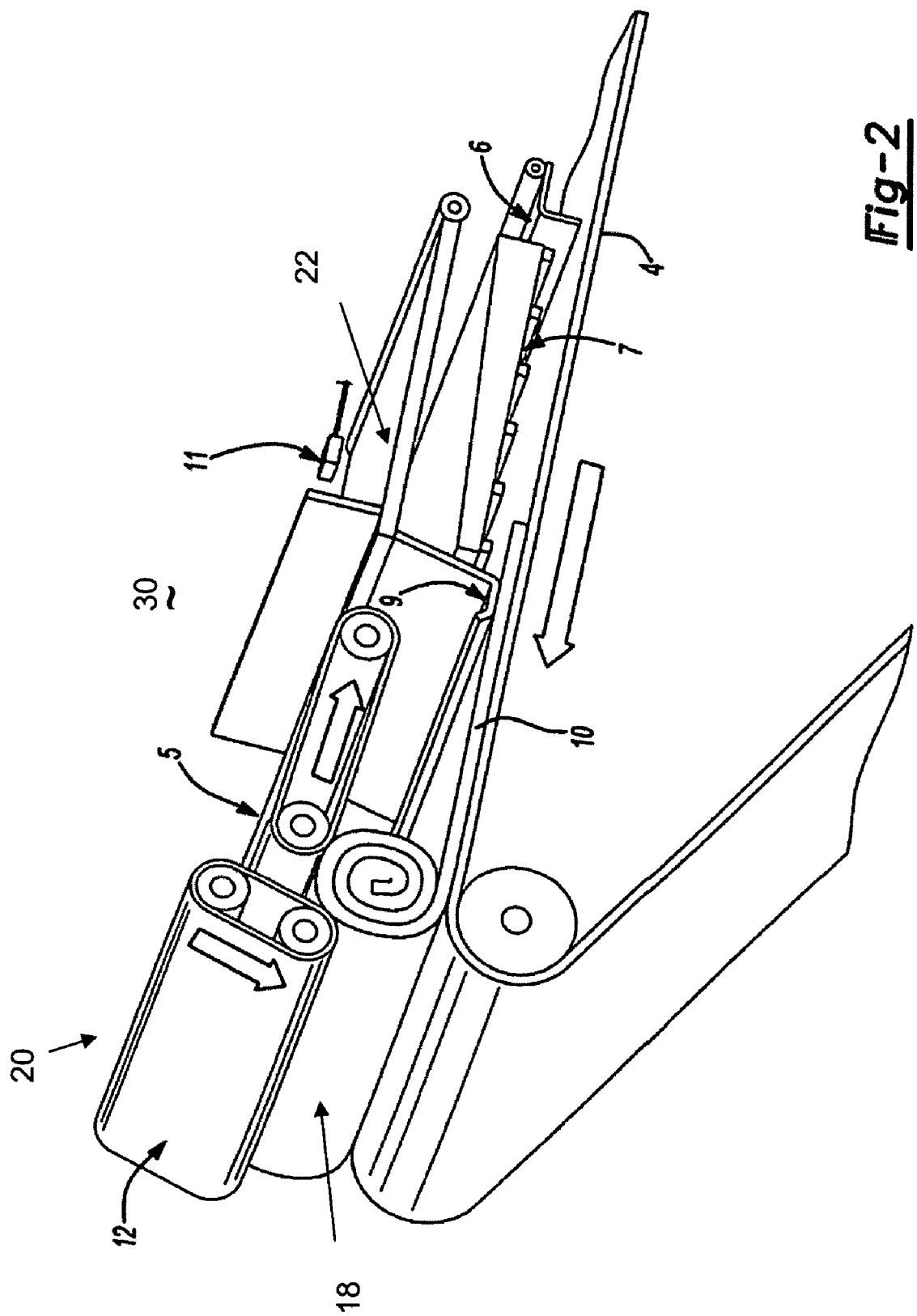
FIG. 2 is a sod roller arranged in accordance with the principles of the present invention.

FIG. 2 depicts a side view of a roll-up mechanism 20 arranged in accordance with the principles of the invention. The roll-up mechanism 20 includes a transport conveyor 4, a starter gate 6, a tray 7, and a roll-up conveyor 5, which operate as described in connection with FIG. 1. In accordance with the present invention, the roll-up mechanism 20 further includes a device for sensing the end of the strip of sod, specifically a runner 9 rides on sod strip 10. Once the end of sod strip 10 has passed the runner 9, runner 9 drops down to the level of the transport conveyor. A flange 22 linked to runner 9 activates a proximity switch 11. Although a proximity switch 11 is shown herein, one skilled in the art will recognize that other devices for sensing the end of the sod strip 10 could include a mechanical micro-switch, various proximity sensors, or an optical sensor.

In the embodiment shown in FIG. 2, a third, holding conveyor 12 located at the rear end of the roll-up conveyor 5 holds the sod roll 18 in the roll-up conveyor. Holding conveyor 12 is generally vertical and rotates in the same directions as roll-up conveyor 5, but at the same surface speed of transport conveyor 4. The lower end of the holding conveyor 12 is located slightly lower than the rear end of roll-up conveyor 5. The relative positioning of the conveyors forms a slight pocket between the two conveyors, which holds sod roll 18. One skilled in the art will recognize that a roller may be substituted for the holding conveyor 12.

Figure 3:
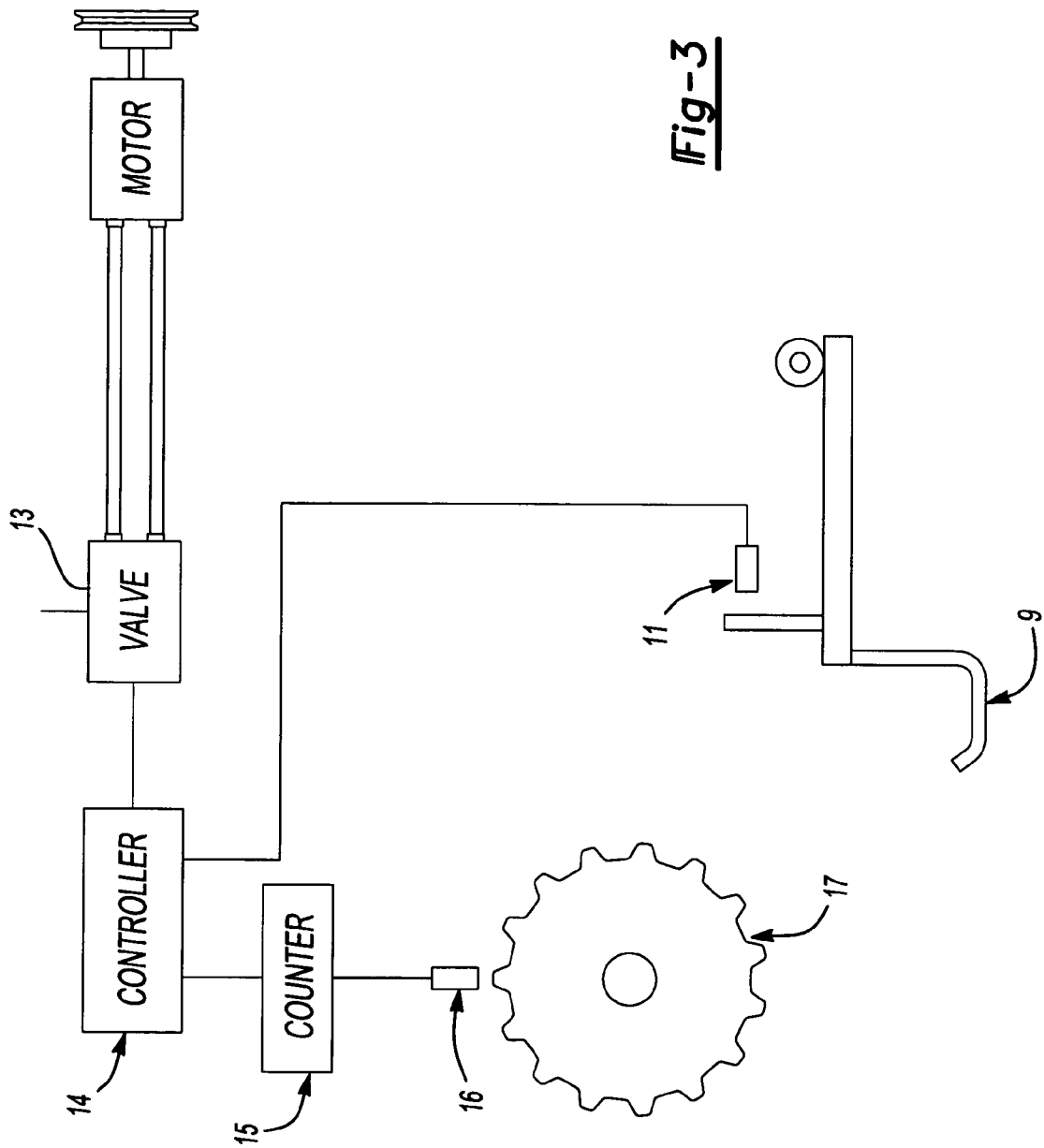
FIG. 3 is a control system for operating the sod roller of the present invention.

FIG. 3 depicts a system 30 for ejecting the sod roll from 18 roll-up conveyor 5 in response to the position of the trailing edge of sod strip 10. System 30 includes a valve 13 that controls rotation of the holding conveyor 12. When holding conveyor 12 stops, transport conveyor 4 carries the sod roll 18 rearward (to the left in FIG. 2) and ejects sod roll 18.

Hydraulic valve 13 is controlled electronically. When the trailing edge of sod strip 10 is sensed, controller 14 receives a signal. After a predetermined delay, controller 14 sends a signal to stop holding conveyor 12. The predetermined delay can be controlled either with a timer or with a counter. As shown, counter 15 counts pulses from a proximity sensor 16 that senses teeth of a sprocket 17 mounted to the transport conveyor 4 drive. As a tooth of sprocket 17 passes proximity sensor 16, proximity sensor 16 sends a signal to controller 14.

Roll-up mechanism 20 ejects sod roll 18 from roll-up conveyor 5 based on the position of the end, or the flap, sod roll 18, as sensed by runner 9. The time delay from when the end of the strip is sensed can be adjusted so that the end of the flap is at a desired angular position about the roll at the moment when the roll is ejected from the roll-up conveyor.

The present invention eliminates variability in the position of the flap. The present invention is less susceptible to variation in the length of sod because the trailing edge portion, or flap, of the sod strip is what controls the timing of the ejection. Variation in sod thickness and amount of slip have limited effect on the position of the flap because the sod continues rolling for only a short time after the control signal is generated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for rolling a sod strip into a sod roll comprising:
    a transport conveyor for displacing the sod strip;
    a first sensor configured to sense movement of the transport conveyor;
    a starter for initiating the rolling of the sod strip in proximity to a leading portion of the sod strip being displaced by the transport conveyor;
    a tray for at least partially retarding displacement of an upper portion of the sod roll as it passes to assist rolling the sod strip;
    an edge detector for detecting a trailing edge of the sod strip as the sod strip is displaced on the transport conveyor;
    a roll-up conveyor for further rolling up the sod strip, the roll-up conveyor operating in a direction opposite the transport conveyor; and
    a holding conveyor, the holding conveyor maintaining the sod roll on the transport conveyor;
    a second sensor operating in cooperation with the edge detector, wherein the second sensor is activated when the edge detector has detected the trailing edge portion of the sod strip;
    a controller, the controller receiving inputs from the first and second sensors, the controller deactivating operation of the holding conveyor after a predetermined amount of movement of the transport conveyor sensed by the first sensor and after activation of the second sensor to position the sod roll in a predetermined orientation.

2. The apparatus of claim 1 wherein the edge detector comprises a runner configured to move from a sod engaging position to a second position not engaging the sod upon the displacement of the sod along the transport conveyor, said runner further operating in cooperation with the second sensor, wherein the second sensor produces a controller readable signal when the edge detector has detected the trailing edge portion of the sod strip.

3. The apparatus of claim 1 wherein the holding conveyor is oriented generally diagonally with respect to the roll-up conveyer.

4. The apparatus of claim 3 wherein the holding conveyor operates in the same direction as the transport conveyor.

5. The apparatus of claim 1 wherein the controller determines the remaining length of the sod strip to be displaced by the transport conveyor in accordance with displacement of the sod strip along the transport conveyor as a function of inputs from the first and second sensors.

6. An apparatus for rolling a sod strip being displaced by a transport conveyor into a sod roll comprising:
    a trailing edge sensor for detecting a trailing edge portion of the sod strip;
    a retaining device for retaining the sod roll in the conveyor as the sod strip is rolled into a sod roll; and
    an ejector device for ejecting the roll in accordance with a position of the trailing edge portion of the sod strip;
    a holding conveyor, the holding conveyor located in proximity to an end of the transport conveyor, wherein activation of the holding conveyor retains the sod roll on the transport conveyor and deactivation of the holding conveyor enables the sod roll to move off of the transport conveyor;

wherein the ejector device further comprises a controller, the controller configured to control the transport and holding conveyors, said controller further configured to receive an input signal from the trailing edge sensor and enabling a user definable time delay before deactivating the holding conveyor to position the sod roll in a predetermined orientation;

a transport conveyor sensor, the transport conveyor sensor measuring displacement of the transport conveyor, wherein the controller deactivates the holding conveyor in response to a predetermined length of displacement of the transport conveyor following detection of the trailing edge portion of the sod strip.

7. The apparatus of claim 6 wherein the trailing edge sensor comprises a member in contact with the sod strip, the member being displaced to a first position when in contact with the sod strip and being displaced to a second position when not in contact with the strip, wherein displacement between the first and second positions indicates the presence of an edge portion of the sod strip.

8. A method for rolling sod strips into a sod roll comprising the steps of:

providing a transport conveyor;

locating a trailing edge portion of the sod strip;

determining a user adjustable time delay which is a function of the displacement of the transport conveyor and the location of the trailing edge portion of the strip;

retaining the sod roll in the transport conveyor as the sod strip is rolled into a sod roll;

rotationally adjusting the roll to a predetermined orientation;

measuring displacement of the transport conveyor;

ejecting the roll;

wherein the step of retaining further comprises providing a holding conveyor, the holding conveyor located in proximity to an end of the transport conveyor, wherein activation of the holding conveyor retains the sod roll on the transport conveyor and deactivation of the holding conveyor enables the sod roll to move off of the transport conveyor; and wherein deactivating the holding conveyor in response to a predetermined length of displacement of the transport conveyor following detection of the trailing edge portion of the sod strip.

9. The method of claim 8 wherein the step of detecting the trailing edge portion further comprises providing a member to contact the sod strip to indicate a first position when in contact with the sod strip and being displaced to a second position when not in contact with the sod strip, wherein displacement between the first and second positions indicates the presence of a trailing edge portion of the sod strip.

10. The method of claim 8 wherein the step of ejecting further comprises enabling adjustable time delay before deactivating the holding conveyor.

* * * * *